(12) United States Patent  (10) Patent No.: US 8,261,845 B2
Palen  (45) Date of Patent: Sep. 11, 2012

(54) WALKING BEAM ASSEMBLY AND LIFT SYSTEM FOR TILLAGE IMPLEMENTS

(75) Inventor: Nelson J. Palen, Beloit, KS (US)

(73) Assignee: AGCO Corporation, Duluth, GA (US)

( * ) Notice: Subject to any disclaimer, the term of this patent is extended or adjusted under 35 U.S.C. 154(b) by 271 days.

(21) Appl. No.: 12/423,386

(22) Filed: Apr. 14, 2009

(65) Prior Publication Data

US 2010/0258325 A1    Oct. 14, 2010

(51) Int. Cl.
*A01B 63/16* (2006.01)
(52) U.S. Cl. .................... 172/423; 172/396; 172/401
(58) Field of Classification Search .............. 172/396, 172/401, 423
See application file for complete search history.

(56) References Cited

U.S. PATENT DOCUMENTS

| | | | | |
|---|---|---|---|---|
| 2,458,091 A | * | 1/1949 | Moore | 172/396 |
| 2,493,023 A | * | 1/1950 | Pointer | 280/685 |
| 2,611,309 A | * | 9/1952 | Crain | 172/233 |
| 2,743,936 A | * | 5/1956 | Bigge | 280/656 |
| 3,253,838 A | | 5/1966 | Hickman | |
| 3,262,715 A | * | 7/1966 | Abbott | 280/124.114 |
| 3,336,044 A | * | 8/1967 | Hatten | 280/677 |
| 3,369,823 A | * | 2/1968 | Tomen | 280/103 |
| 3,447,621 A | | 6/1969 | Schoonover | |
| 3,467,408 A | * | 9/1969 | Regalia | 280/656 |
| 4,108,249 A | * | 8/1978 | Anderson et al. | 172/328 |
| 4,139,065 A | | 2/1979 | Lewison | |
| 4,227,711 A | * | 10/1980 | Wheeler | 280/81.1 |
| 4,407,381 A | | 10/1983 | Oswald et al. | |
| 4,572,311 A | | 2/1986 | Oswald et al. | |
| 4,941,676 A | | 7/1990 | Kopczynski | |
| 4,974,684 A | | 12/1990 | Stevens | |
| 5,186,485 A | | 2/1993 | Orr et al. | |

(Continued)

FOREIGN PATENT DOCUMENTS

DE    4003203 A1    8/1990

(Continued)

OTHER PUBLICATIONS

International Search Report and Written Opinion from corresponding PCT Application No. PCT/IB2010/000695 (dated Nov. 18, 2010).

*Primary Examiner* — Thomas B Will
*Assistant Examiner* — Joel F. Mitchell

(57) ABSTRACT

A tillage machine has an undercarriage that utilizes a triple axle walking beam wheel assembly for each load-supporting wheel assembly of the center section of the machine. Hydraulically powered lift arms are connected with the wheel assemblies to raise and lower the chassis of the machine as the wheel arms are swung downwardly and upwardly relative to the chassis. Each wheel assembly includes a primary walking beam pivoted to the lower end of the wheel arm, and a secondary walking beam pivoted to the rear end of the primary beam. A single front wheel is disposed at the front end of the primary beam, while a pair of wheels are disposed on the secondary beam on opposite fore-and-aft sides of the pivot connection with the primary beam. An abutment on the wheel arm engages a stop on the primary beam upon downward rotation of the wheel arm by a predetermined amount relative to the chassis such that continued downward movement of the wheel arm causes load to shift partially off the front wheel and onto the rear wheels.

11 Claims, 9 Drawing Sheets

U.S. PATENT DOCUMENTS

| | | | |
|---|---|---|---|
| 5,277,257 A * | 1/1994 | Thompson et al. | 172/4 |
| 5,427,184 A * | 6/1995 | Peck | 172/395 |
| 5,482,326 A * | 1/1996 | Levi | 280/682 |
| 5,655,615 A * | 8/1997 | Mick | 180/24.02 |
| 5,829,535 A * | 11/1998 | Line | 172/398 |
| 6,003,616 A * | 12/1999 | Goins et al. | 172/669 |
| 7,398,983 B2 * | 7/2008 | Van Den Engel | 280/104 |

FOREIGN PATENT DOCUMENTS

| | | |
|---|---|---|
| EP | 1738635 B1 | 1/2007 |

* cited by examiner

WALKING BEAM ASSEMBLY AND LIFT SYSTEM FOR TILLAGE IMPLEMENTS

TECHNICAL FIELD

The present invention relates to tillage equipment and, more particularly, to a triple axle walking beam and chassis lift system for such an implement.

BACKGROUND AND SUMMARY

It is well known in the art to provide tillage machines with double axle walking beam undercarriages. Such a walking beam undercarriage spreads the load over a pair of axles at each wheel assembly and helps smooth out the ride as the undercarriage traverses uneven terrain. However, as tillage implements become bigger and heavier, there is a need for additional load support spread over additional axles, particularly for the center section of a folding winged implement in which the weight of wing sections is borne by the center section when the wing sections are folded for transport.

Accordingly, the present invention provides a triple axle walking beam undercarriage that provides increased load support and smoother ride than available with conventional double axle walking beam assemblies. Whereas in a conventional double axle assembly a single walking beam having one wheel axle at the front and another at the rear oscillates freely about a central, transverse axis as the wheels successively "walk" over obstacles, in the present invention the single beam is replaced by a pair of hingedly interconnected beams comprising a primary beam and a secondary beam. The primary beam is pivotally attached to the wheel lift arm of the chassis for oscillation about a primary transverse axis, while the secondary beam is pivotally attached to the rear of the primary beam for oscillation relative to the primary beam about a secondary transverse axis. The secondary beam has a pair of ground wheels attached to front and rear ends thereof for supporting the rear end of the primary beam, while the primary beam itself has a single wheel attached to the front end thereof. In this manner, additional load support is provided by the three axles associated with the three ground wheels, yet each of the wheels can oscillate up and down independently of the others as need be to smooth out the ride.

The present invention also provides a way of transferring some of the weight of the machine from the front wheel of the walking beam assembly to the rear wheels when the chassis of the machine is raised to a fully lifted position such as occurring at the end of the field when the machine is lifted and turned for the next pass. Although such weight transfer arrangement is beneficial in a triple axle system, the principles are also of value in a double axle system.

Such weight transfer is accomplished through the provision of an abutment on the wheel lift arm that comes into abutting engagement with a stop on the walking beam assembly after the wheel arm has swung down to a predetermined extent relative to the rising chassis. Whereas prior to such abutting engagement the load is fairly equally distributed over all wheels of the walking beam assembly, once the abutment engages the stop, the walking beam assembly is essentially locked up against oscillation in one direction such that further downward swinging of the wheel arm tends to lift the front wheel and exert additional loading on the rear wheel or wheels. This keeps the point of major ground support located far enough rearwardly with respect to the center of gravity of the chassis that tongue weight is increased and the chassis is prevented from becoming "tail heavy." Without the weight transfer arrangement, the machine could suddenly become tail heavy when it is raised during turns at the end of the field, causing the hitch connection at the front end of the tongue to slam up against the tractor draw bar, damaging the equipment and jarring the operator. Preferably, the stop that is engaged by the abutment on the wheel arm is made of resilient material to provide a cushioning effect during engagement of the abutment with the stop.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
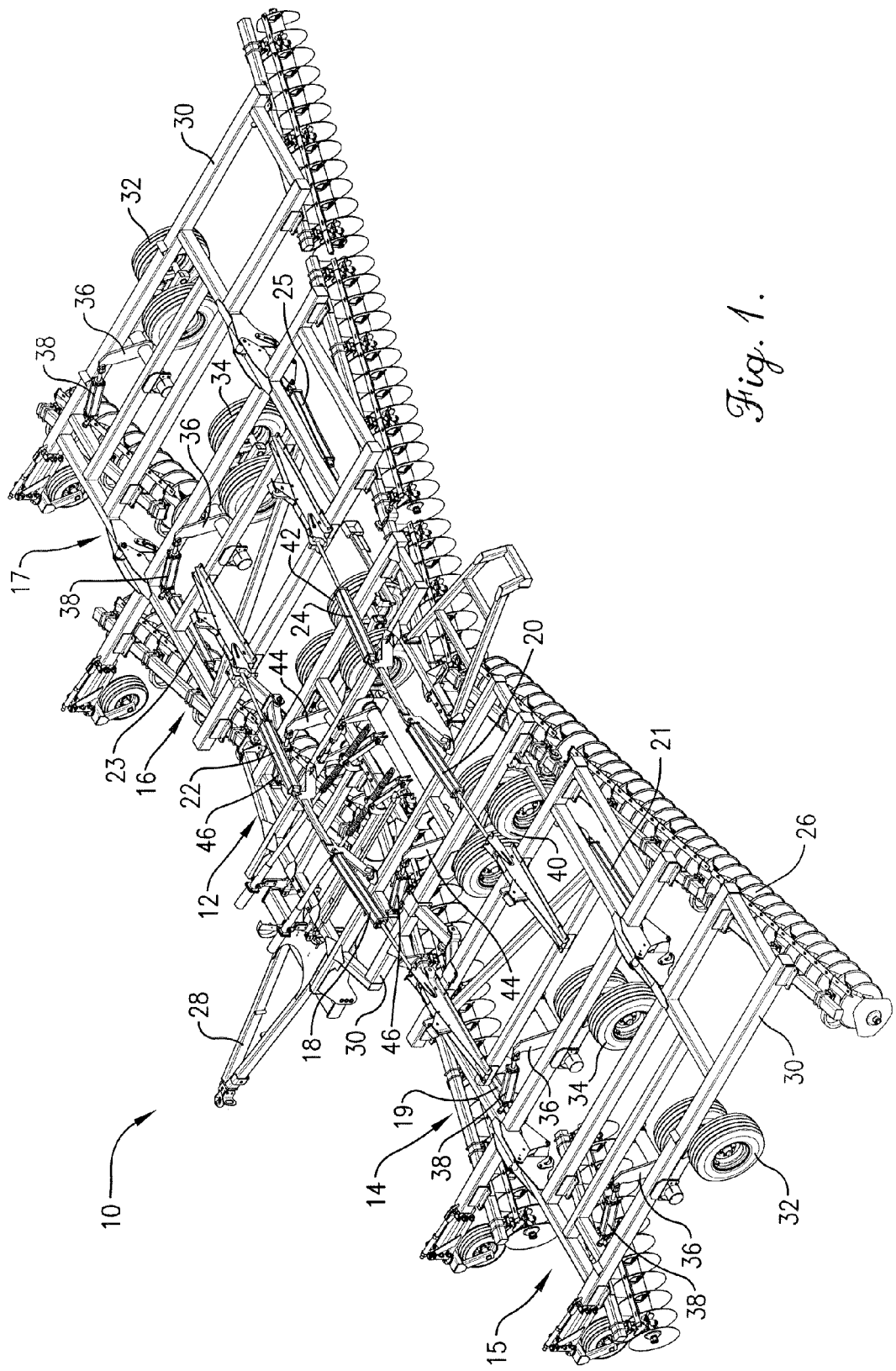
FIG. 1 is a left, top isometric view of one exemplary tillage machine utilizing a walking beam and lift system arrangement in accordance with the principles of the present invention, the tillage machine being shown in a field working position.

The tillage machine 10 illustrated in FIG. 1 has been selected as but one of many different possible examples of machines with which the present invention may be utilized. In the illustrated embodiment, machine 10 is a five-section folding machine comprising a center section 12, two inner wing sections 14 and 16 hingedly attached to opposite sides of center section 12, and two outer wing sections 15 and 17 hingedly attached to respective outer ends of inner wing sections 14, 16. As well known in the art, wing sections 14, 15, 16 and 17 can "flex" about respective fore-and-aft axes at their hinge points so as to accommodate changes in ground contour experienced locally by the five sections of the machine. In addition, inner wing sections 14, 16 can be raised into folded positions (not shown) utilizing hydraulic inner wing lift cylinders 18, 20, 22 and 24, while outer wing sections 15, 17 can be "flat-folded" onto inner sections 14, 16 using hydraulic outer wing lift cylinders 19, 21, 23 and 25. Each of the sections carries tillage tools such as gangs of discs 26 for working the soil as the machine is advanced across a field. A tongue 28 projects forwardly from center section 12 for hitching the machine to a towing vehicle (not shown).

Each section has its own frame or chassis 30 to which the tillage tools of that section are attached. Each section also has its own undercarriage for supporting the chassis 30 during field operations and, in the case of the undercarriage of center section 12, supporting the load of essentially the entire machine during transport when wing sections 14, 15, 16 and 17 are folded up. In the case of outer wing sections 15, 17, the undercarriage for each of those sections comprises a wheel assembly 32, while in the case of inner wing sections 14, 16, the undercarriage for each of those sections comprises a wheel assembly 34. Wheel assemblies 32, 34 are preferably of the conventional double axle walking beam type. A crank arm 36 associated with each wing section wheel assembly 32, 34 is operable by a corresponding wheel lift cylinder 38 to raise or lower chassis 30 in order to control the depth of penetration of the tillage tools 26. On the other hand, the pair of wheel assemblies 40 and 42 for center section 12 are triple axle walking beam wheel assemblies in accordance with the principles of the present invention. These two wheel assemblies 40, 42 are operated by crank arms 44 that are in turn operated by lift cylinders 46 to raise and lower chassis 30 of center section 12 simultaneously with raising and lowering of chassis 30 of the wing sections 14, 15, 16 and 17.

Figure 7:
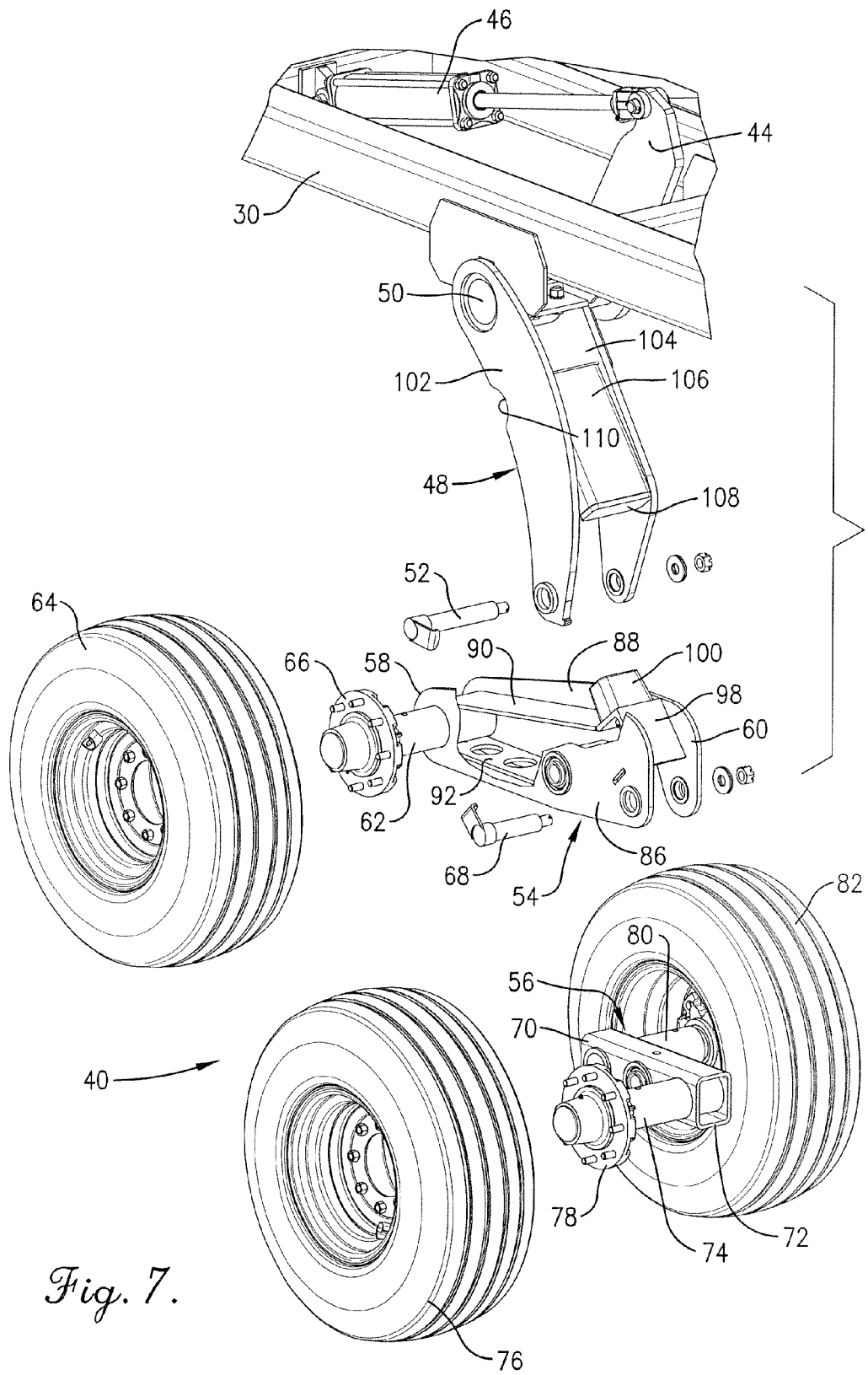
FIG. 7 is a fragmentary, left, rear, exploded isometric view of the left triple axle walking beam assembly and associated structure of the center section.
Figure 8:
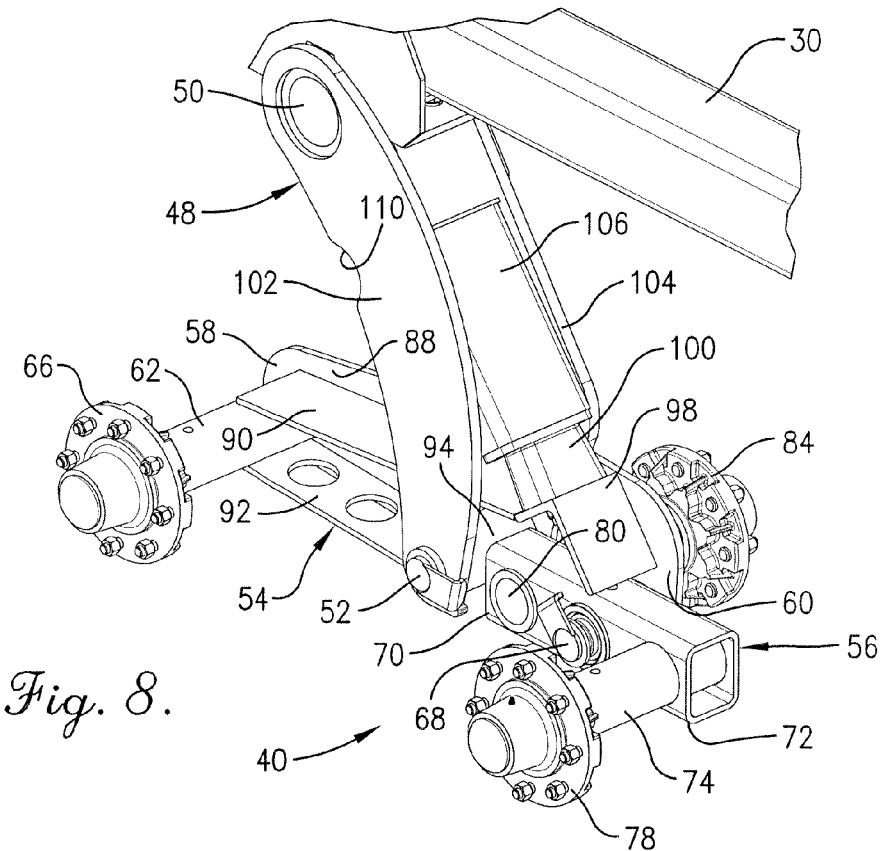
FIG. 8 is an enlarged, fragmentary, left rear isometric view of the wheel assembly in FIG. 7 with wheels removed and the left side plate of the primary beam of the walking beam assembly removed to reveal details of construction, the machine being illustrated in a raised position corresponding to FIGS. 3, 5 and 7.

As illustrated particularly in FIGS. 7 and 8, and using assembly 40 as an example of the construction and operation of both triple axle walking beam wheel assemblies 40, 42, wheel assembly 40 is mounted on the chassis 30 by a wheel arm 48 having an upper end that is fixed to a transverse torque tube 50 (FIG. 2, for example) rotatably supported on chassis 30. Upstanding crank arm 44 is likewise fixed to torque tube 50 such that when hydraulic cylinder 46 is actuated, crank arm 44 rotates torque tube 50, which in turn swings wheel arm 48 up and down about the longitudinal axis of torque tube 50. Wheel assembly 40 is pivotally mounted on the lower end of wheel arm 48 by a transverse pivot 52.

Wheel assembly 40 includes a primary fore-and-aft walking beam 54 and a secondary fore-and-aft walking beam 56. Pivot pin 52 attaches primary beam 54 to wheel arm 48 at a point intermediate the opposite front and rear ends 58 and 60 of primary beam 54. In this way, primary beam 54 can rock in opposite up and down directions about the axis defined by pivot pin 52.

At the front end 58 of primary beam 54, an axle 62 projects laterally outwardly therefrom to rotatably support a front, outboard ground-engaging wheel 64 via a hub 66. At its rear end 60, the primary beam 54 is provided with another pivot pin 68 that pivotally attaches secondary beam 56 to primary beam 54 such that secondary beam 56 can rock in opposite up and down directions about the axis defined by pivot pin 68. Pivot pin 68 is located intermediate a front end 70 and a rear end 72 of secondary beam 56. At the rear end 72 of secondary beam 56, an axle 74 projects laterally outwardly therefrom and rotatably supports an outboard ground-engaging wheel 76 via a hub 78. At the front end 70 of secondary beam 56, an axle 80 projects laterally inwardly from secondary beam 56 to rotatably support an inboard, ground-engaging wheel 82 via a hub 84. It will be noted that outboard ground-engaging wheels 64 and 76 are disposed in fore-and-aft alignment with one another whereas inboard ground-engaging wheel 82 is disposed inboard of wheels 64, 76 on the opposite, inboard sides of primary beam 54 and secondary beam 56.

Primary beam 54 is a fabricated structure having a pair of laterally spaced apart, opposite side plates 86 and 88. Plates 86, 88 are fixed to a pair of upper and lower, vertically spaced apart, top and bottom plates 90 and 92 respectively that cooperate with side plates 86, 88 to form a rigid, box-like construction for primary beam 54. Front axle 62 penetrates into the interior of primary beam 54 as illustrated in FIGS. 7 and 8 and is rigidly affixed to both top and bottom plates 90, 92, as well as side plates 86, 88. As illustrated in FIG. 8, a sleeve 94 spans side plates 86, 88 intermediate opposite ends 58, 60 of primary beam 54 to serve as a means for journaling pivot pin 52. Top and bottom plates 90, 92 terminate at their rear ends in the vicinity of sleeve 94 such that the space between side plates 86, 88 rearwardly of sleeve 94 is largely open so as to provide operating clearance for the front end 70 of secondary beam 56, which is received between the rear end portions of side plates 86, 88.

Figure 9:
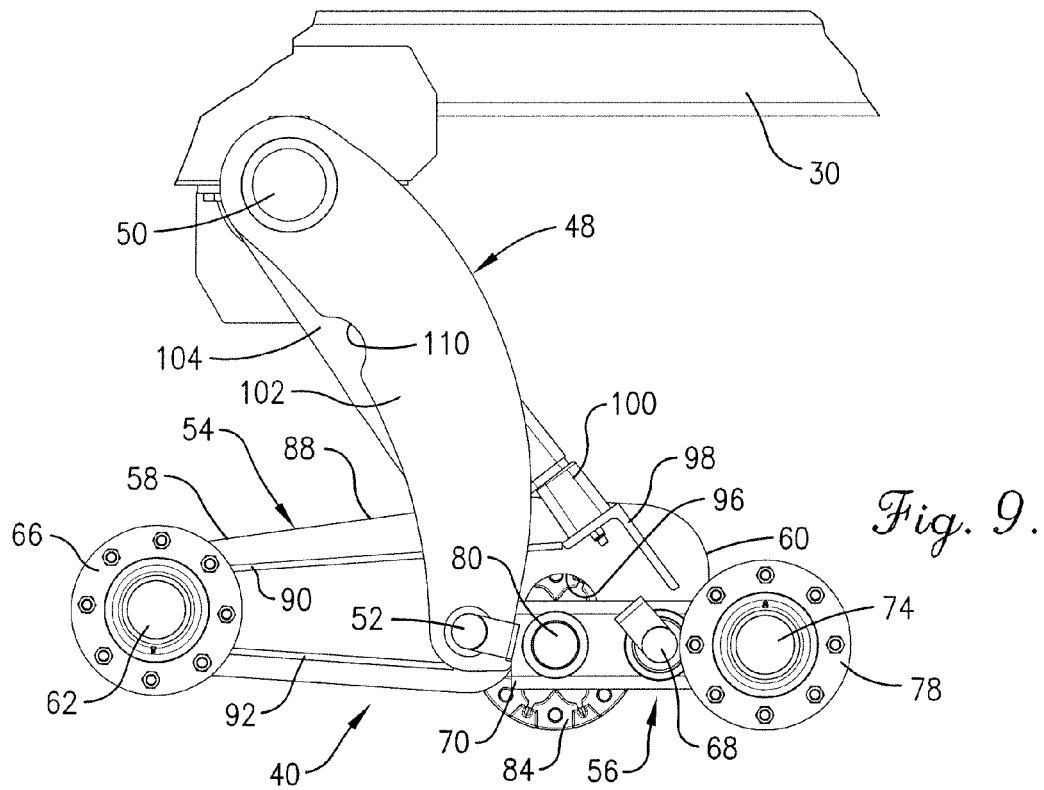
FIG. 9 is a fragmentary side elevational view of the wheel assembly in the FIG. 8 position with wheels and the left side plate of the primary beam removed to reveal details of construction.

As illustrated in FIG. 9, for example, inboard side plate 88 has a downwardly opening notch 96 that provides operating clearance for front axle 80 of secondary beam 56 as secondary beam 56 rocks up and down about the axis of pivot pin 68. An inverted, L-shaped bracket 98 supports a block-like stop 100 that projects upwardly and forwardly from bracket 98 to protrude above the upper extremity of primary beam 54. Preferably, although not necessarily, stop 100 is constructed from a resilient material such as a suitable elastomeric substance. One suitable stop is commercially available from McMaster-Carr Supply Company of Princeton, N.J. as an SBR heavy duty rubber guard having a durometer hardness of 60 A-75 A, part number 21685T13.

Wheel arm 48 has a pair of laterally spaced apart side plates 102 and 104 whose lower ends straddle primary beam 54 and are coupled with pivot pin 52 on the outside faces of side plates 86, 88. A rectangular, box-like abutment 106 is captured between and rigidly secured to side plates 102, 104 in such a position that its lower face 108 generally faces the upper surface of stop 100. As will hereinafter be described in further detail, abutment 106 is disposed to come into force-transmitting engagement with stop 100 when wheel arm 48 has been swung downwardly relative to chassis 30 by a predetermined amount. A downwardly opening notch 110 is provided in the outboard side plate 102 so as to clear front axle 62 of primary beam 54 when wheel arm 48 is fully raised relative to chassis 30 as illustrated, for example, in FIGS. 10 and 11.

Figure 2:
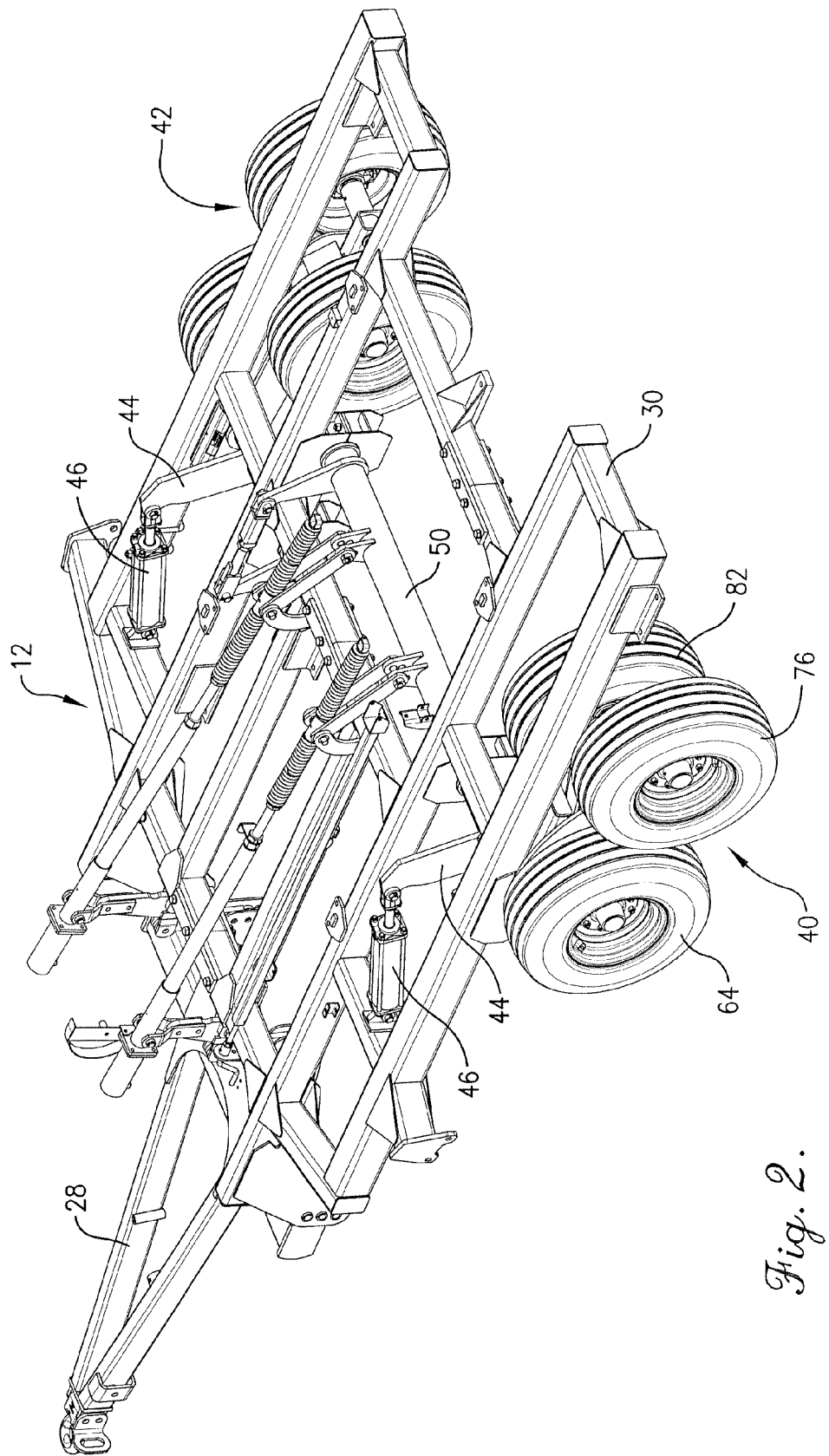
FIG. 2 is an enlarged left, rear, top isometric view of the machine of FIG. 1 with the wing sections removed to more clearly reveal the triple axle walking beam wheel assemblies utilized with the center section of the machine.
Figure 3:
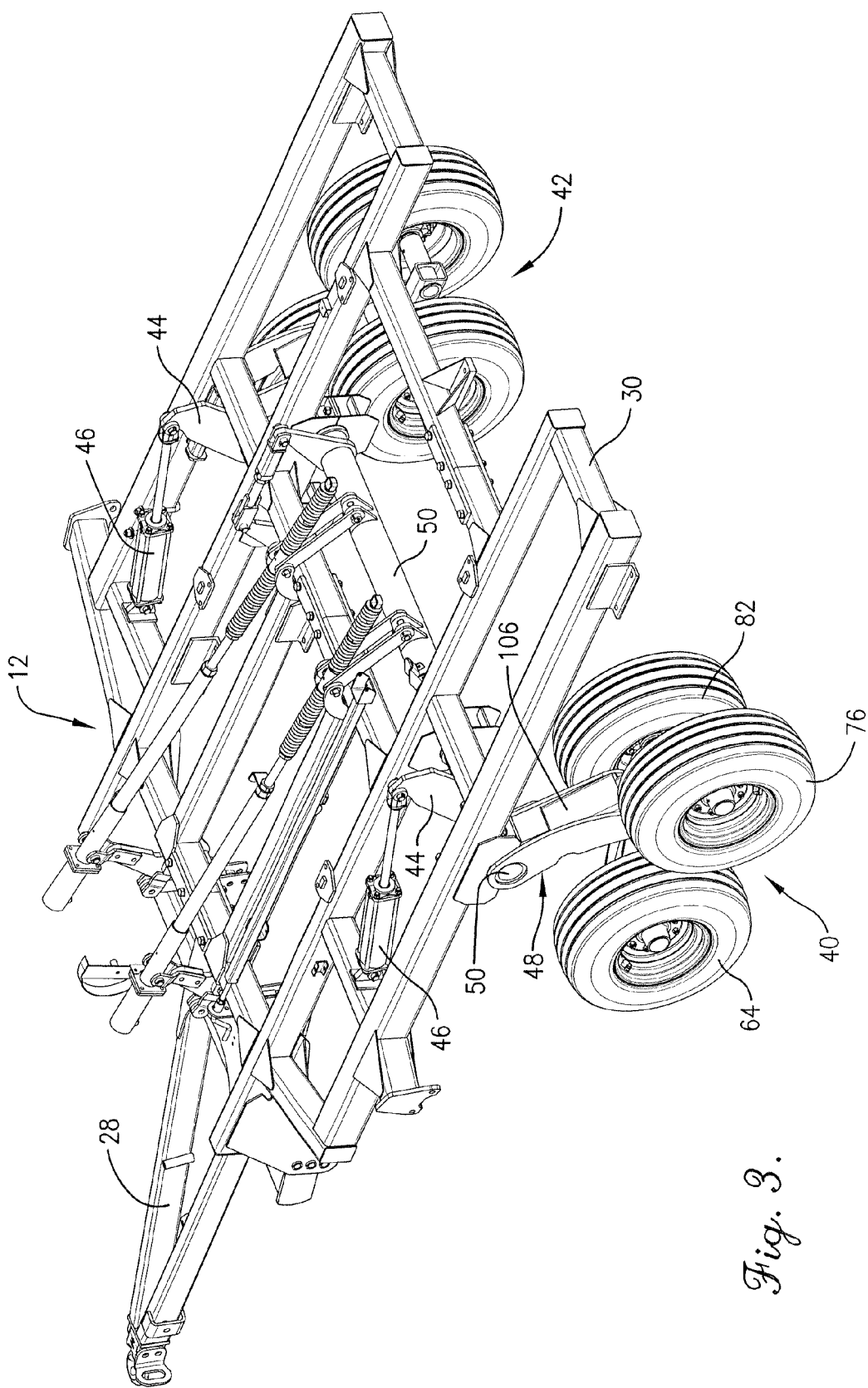
FIG. 3 is an isometric view of the machine similar to FIG. 2 but illustrating the machine in a raised position in which the abutment on the wheel arm has come into engagement with a stop on the walking beam wheel assembly.
Figure 4:
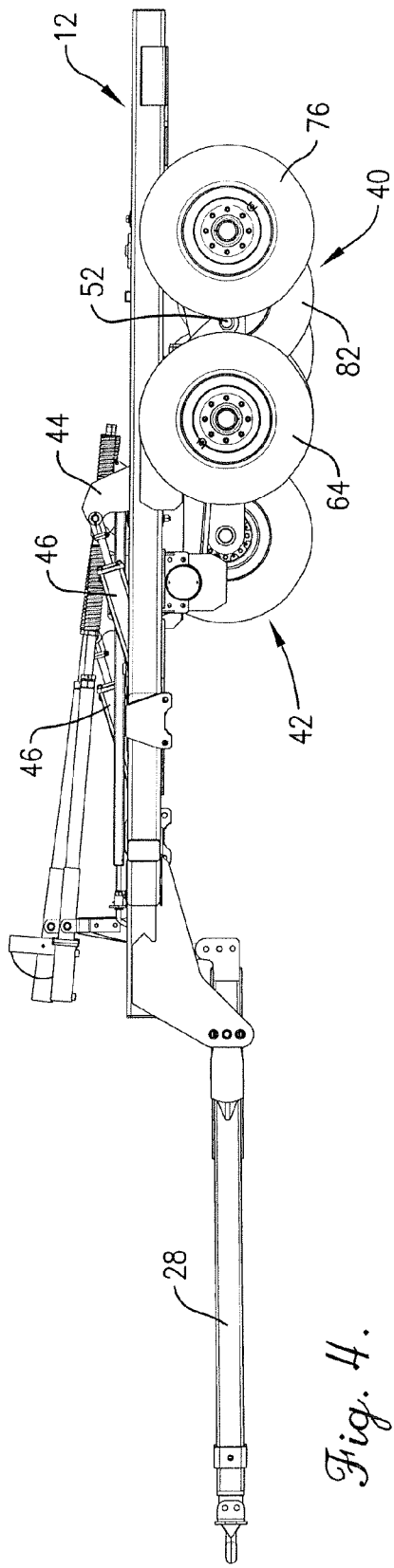
FIG. 4 is a side elevational view of the center section of the machine in a field working position corresponding to FIGS. 1 and 2.
Figure 5:
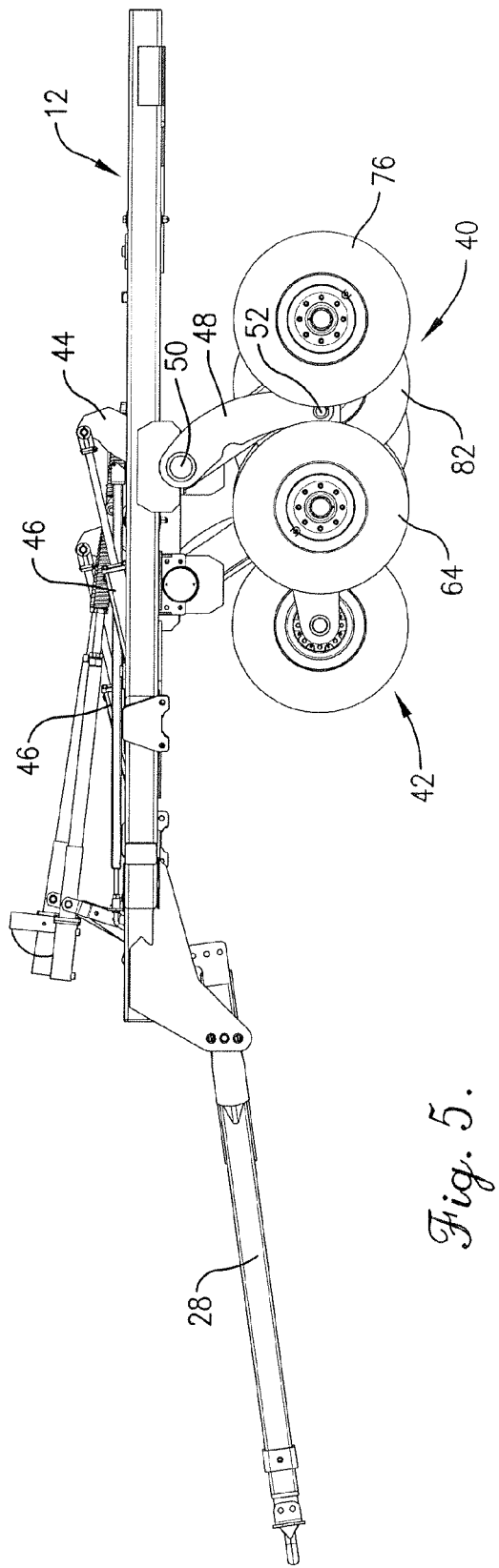
FIG. 5 is a side elevational view of the center section in a raised position corresponding to FIG. 3.
Figure 6:
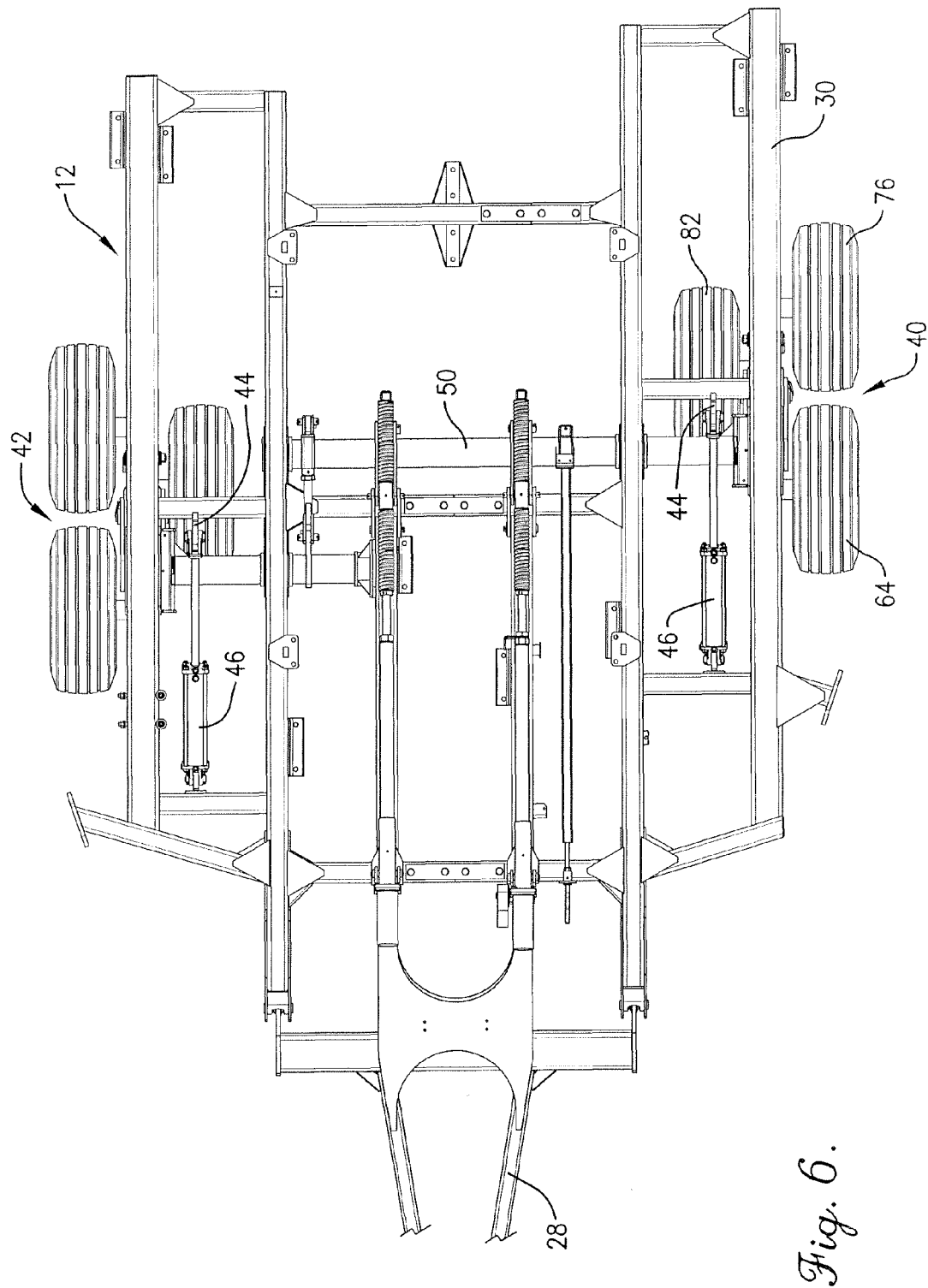
FIG. 6 is a fragmentary, top plan view of the center section in a raised position corresponding to FIGS. 3 and 5.

As machine 10 travels through the field in a lowered working position as illustrated in FIGS. 1 and 2, for example, the triple axle walking beam wheel assemblies 40 and 42 function to support the load of the center section 12, to limit the depth of penetration of the tillage tools 26, and to smooth out the ride of the center section as undulations and obstacles are encountered in the field. Of course, wing section wheel assemblies 32, 34 perform the same functions for wing sections 14, 15, 16 and 17 at this time.

Figure 12:
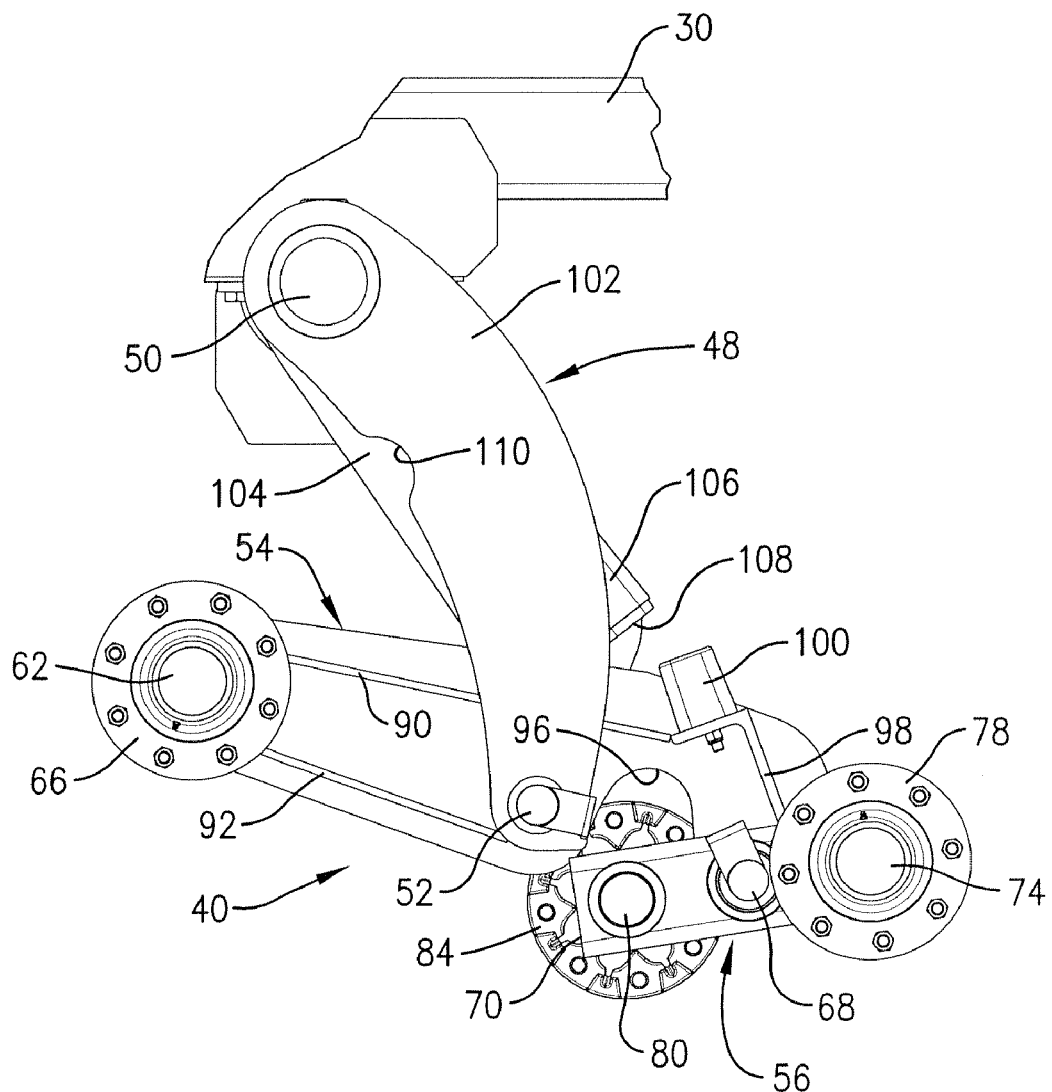
FIG. 12 is a fragmentary, left elevational view of the wheel assembly when the machine is in a raised position, illustrating the manner in which the primary and secondary beams of the walking beam assembly can oscillate independently of one another.

FIG. 12, which happens to show the wheel assembly 40 in a fully lowered position wherein chassis 30 is fully raised, illustrates the type of oscillating rocking action that is available by the primary beam 54 and secondary beam 56 of the triple axle wheel assemblies 40, 42. Primary beam 54 can rock up and down about pivot 52 as front wheel 64 encounters rises and falls, while secondary beam 56 can itself pivot up and down about pivot 68 as rises and falls are encountered by rear wheel 76 and inboard wheel 82. Thus, the ride is smoothed out while increased load capacity is obtained through the provision of three axles instead of two as in a conventional double axle walking beam assembly.

Figure 10:
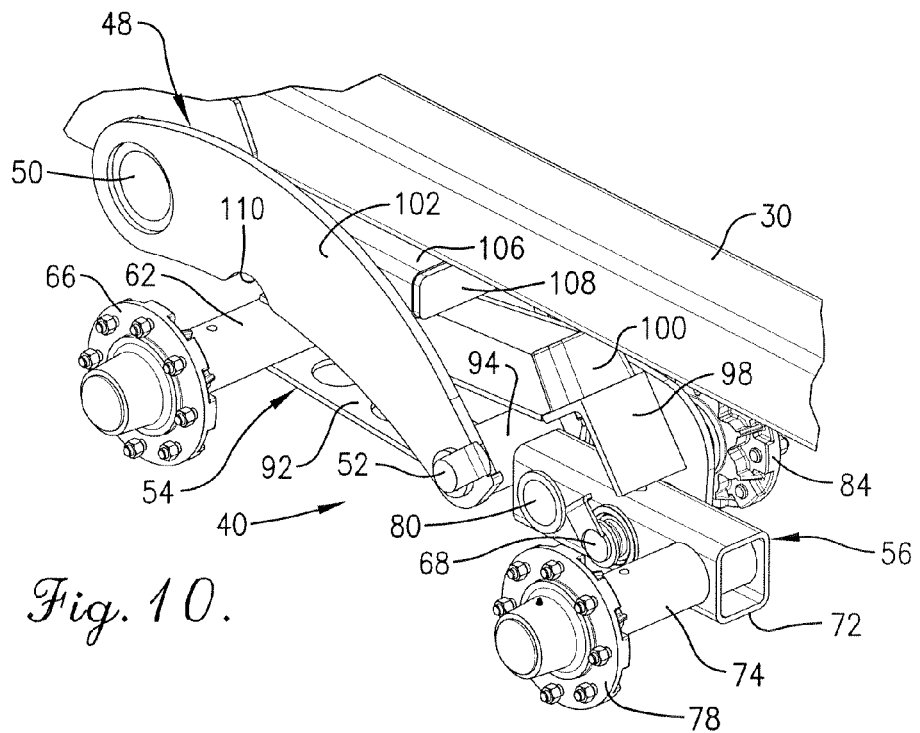
FIG. 10 is a fragmentary, left rear isometric view of the wheel assembly similar to FIG. 8 but with the machine in its lowered, field working position corresponding to FIGS. 1, 2, and 4.
Figure 11:
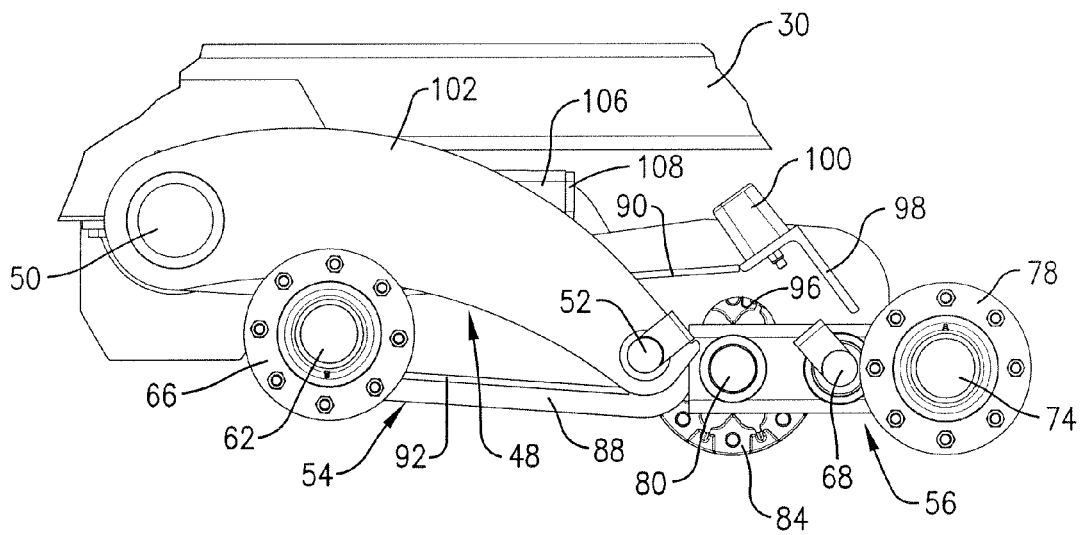
FIG. 11 is a fragmentary side elevational view of the wheel assembly with the machine in the lowered position of FIG. 10.

When the machine is in a lowered, field working position, the abutment 106 with each wheel arm 48 is spaced substantially forwardly from stop 100 as illustrated, for example in FIGS. 10 and 11. However, when the operator comes to the end of a pass and turns around to start the next pass in the opposite direction, he will normally raise the implement so that all tillage tools 26 are out of the ground during the turn. All sections of the machine are raised simultaneously, but focusing particularly on center section 12, it will be seen that as wheel arms 48 are rotated downwardly by their actuating cylinders 46, the wheel assemblies 40 and 42 are displaced forwardly with respect to the center of gravity of the machine. This can be seen, for example, by comparing FIGS. 9 and 11 wherein the pivot 52 in FIG. 9 is spaced considerably further forwardly than in FIG. 11. Thus, without the provision of the special weight transfer feature provided by abutment 106 and stop 100, the machine might tend to become "tail heavy", which encourages the front end of tongue 28 to slam up against the hitch bar of the towing tractor, jarring the machine and the operator. Obviously, this can be damaging to the equipment and physically hard on the operator.

Accordingly, in accordance with one aspect of the present invention, after each wheel arm 48 is swung downwardly relative to chassis 30 by a predetermined amount, abutment 106 engages stop 100, at which point primary beam 54 becomes locked against any further downward swinging movement of its front end relative to wheel arm 48. Thus, continued downward movement of wheel arm 48 in a clockwise direction beyond that illustrated in FIG. 9, for example, causes the front end of primary beam 54, and thus also front wheel 64, to slightly lift up, lightening the load on front wheel 64 and transferring it to wheels 76 and 82 of secondary beam 56. This has the effect of tipping the machine forwardly about rear wheels 76, 82 and increasing the tongue weight of the machine exerted by tongue 28 against the tractor. Consequently, the "tail-heavy" condition is averted, as is damage to the equipment and wear and tear on the operator. Preferably, as noted above, stop 100 is a resilient cushion so that engagement of the latter with abutment 106 is not a jarring engagement and there is a measure of relief provided by the yieldability of stop 100.

It is contemplated that for over-the-road travel, machine 10 will not be raised to its fullest extent, i.e., to such a condition that a significant amount of the weight of the machine would be transferred from front wheels 64 of wheel assemblies 40, 42 to the rear wheels 76, 82. Instead, it is desirable to have the load on all three wheels approximately evenly distributed so as to accommodate the extra load placed upon center section 12 when wing sections 14, 15, 16 and 17 are folded up. To this end, after lift cylinders 46 have been fully extended to fully raise the machine, suitable mechanical cylinder stops, not shown but well known to those skilled in the art, will be placed upon the cylinders 46 to enable them to retract only a certain distance before the mechanical stops prevent further such retraction. At that point, the load is borne by the cylinder stops, and abutment 106 has separated sufficiently from stop 100 as to engage front wheel 64 of each wheel assembly 42, 44 with the ground to substantially the same extent as rear wheels 76, 82. Thus, the load of the machine will be distributed essentially equally over those three wheels.

It will be noted that the inboard location of each third wheel 82 of wheel assemblies 40, 42 helps the undercarriage accommodate a crowned condition of the roadway when the machine is towed along such surface. On back roads in particular, the machine is likely to be towed down the center of such roads, with the crown effect causing the road to slope downwardly from a highest point in the center. There is, therefore, a need for the inboard wheels 82 to ride on slightly higher surfaces than the outboard wheels 64, 76. This is accommodated in the present invention by the secondary beam 56 which can rotate slightly in a clockwise direction viewing the figures as necessary to permit inboard wheel 82 to ride slightly higher than the outboard wheel 76. If need be, primary beam 54 can also rotate slightly counterclockwise to accommodate such action. Regardless, each primary beam 54 and secondary beam 56 is free to oscillate as necessary to walk over irregularities in the road surface and smooth out the ride of the machine.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A tillage machine comprising:
    a mobile frame having tillage tools supported thereon and presenting a front and a rear with respect to the normal direction of forward travel of the machine;
    a pair of laterally spaced wheel arms pivotally attached to the frame,
    each of said wheel arms being adapted for up and down swinging movement relative to the frame about a first transverse axis;
    a primary beam for each of said wheel arms and having a front end and a rear end with respect to the normal direction of forward travel of the machine,
    each of said primary beams being pivotally attached to its wheel arm at a point intermediate said front and rear ends of the primary beam for up and down rocking movement relative to the wheel arm about a second transverse axis;
    a first ground-engaging wheel rotatably attached to the front end of each primary beam respectively;
    a secondary beam for each primary beam and having a front end and a rear end with respect to the normal direction of forward travel of the machine,
    each of said secondary beams being pivotally attached to the rear end of its primary beam at a point intermediate the front and rear ends of the secondary beam for up and down rocking movement relative to the primary beam about a third transverse axis;
    a second ground-engaging wheel rotatably attached to the rear end of each secondary beam respectively;
    a third ground-engaging wheel rotatably attached to the front end of each secondary beam respectively; and
    hydraulic lift mechanism operably connected between the frame and said wheel arms for swinging the wheel arms up and down relative to the frame to raise and lower the frame relative to the ground,
    said primary beams having outboard sides with respect to the normal direction of forward travel of the machine that face away from one another and inboard sides with respect to the normal direction of forward travel of the machine that face toward one another, said first and second ground-engaging wheels being on the outboard sides of the primary beams and said third ground-engaging wheels being on the inboard sides of the primary beams.

2. A tillage machine as claimed in claim 1, each of said third ground-engaging wheels overlapping its corresponding first and second ground-engaging wheels in a fore-and-aft direction.

3. A tillage machine as claimed in claim 2, each of said wheel arms having an abutment disposed to engage a stop on the corresponding primary beam in response to a predetermined amount of downward swinging of the wheel arm relative to the frame, said abutment and stop being operable when mutually interengaged to cause weight transfer from said first ground-engaging wheel to said second and third ground-engaging wheels as said wheel arm swings downwardly beyond said predetermined amount.

4. A tillage machine as claimed in claim 3, one of said abutment and stop being resilient.

5. A tillage machine as claimed in claim 4, said stop being resilient.

6. A tillage machine comprising:

a mobile frame having tillage tools supported thereon and presenting a front and a rear with respect to the normal direction of forward travel of the machine;

at least one wheel arm pivotally attached to the frame for up and down swinging movement relative to the frame about a first transverse axis;

a walking beam assembly including a fore-and-aft extending primary beam and at least a front and a rear ground-engaging wheel rotatably coupled to the primary beam at corresponding front and rear ends thereof, said primary beam being pivotally attached to the wheel arm for up and down rocking movement relative to the wheel arm about a second transverse axis located between said front and rear ends of the primary beam;

a hydraulic lift cylinder operably connected between the frame and the wheel arm for swinging the wheel arm up and down relative to the frame to raise and lower the frame relative to the ground between a raised position and a lowered position; and an abutment on said wheel aim disposed to engage a stop on the primary beam when the frame is in said raised position, said abutment and stop being disposed to preclude substantially all further downward rocking movement of the front end of the primary beam when the abutment and stop are mutually interengaged whereby to cause weight transfer from said front ground-engaging wheel to said rear ground-engaging wheel when said rear ground-engaging wheel is engaging the ground and said wheel arm is swung further downwardly by said hydraulic lift cylinder with the frame in said raised position.

7. A tillage machine as claimed in claim 6, one of said abutment and stop being resilient.

8. A tillage machine as claimed in claim 7, said stop being resilient.

9. A tillage machine as claimed in claim 6, said walking beam assembly further including a secondary beam having a pair of front and rear ends, said secondary beam being pivotally attached to the rear end of said primary beam intermediate said front and rear ends of the secondary beam for up and down rocking movement of the secondary beam relative to the primary beam about a third transverse axis, said rear ground-engaging wheel being rotatably attached to the rear end of said secondary beam, said secondary beam having a third ground-engaging wheel rotatably attached thereto at said front end of the secondary beam.

10. A tillage machine as claimed in claim 9, said primary beam having a pair of opposite sides, said front and rear ground-engaging wheels being on one side of said primary beam, said third ground-engaging wheel being on the other side of said primary beam.

11. A tillage machine as claimed in claim 10, said third ground-engaging wheel overlapping said front and rear ground-engaging wheels in a fore-and-aft direction.

* * * * *